US012698381B2

(12) United States Patent
Wang

(10) Patent No.: US 12,698,381 B2
(45) Date of Patent: Aug. 4, 2026

(54) COMPOSITE TELESCOPIC HOSE AND PREPARATION METHOD THEREOF

(71) Applicant: Shaoxing Shangyu District Fenghua Metal Products Factory, Shaoxing City (CN)

(72) Inventor: Baiqing Wang, Shaoxing City (CN)

(73) Assignee: SHAOXING SHANGYU DISTRICT FENGHUA METAL PRODUCTS FACTORY, Shaoxing City (CN)

( * ) Notice: Subject to any disclaimer, the term of this patent is extended or adjusted under 35 U.S.C. 154(b) by 481 days.

(21) Appl. No.: 18/495,676

(22) Filed: Oct. 26, 2023

(65) Prior Publication Data

US 2025/0115745 A1      Apr. 10, 2025

(30) Foreign Application Priority Data

Oct. 8, 2023    (CN) .......................... 202311290912.2

(51) Int. Cl.
B32B 27/18        (2006.01)
B29K 9/06         (2006.01)
(Continued)

(52) U.S. Cl.
CPC .................. C08L 9/06 (2013.01); B32B 1/08 (2013.01); B32B 5/02 (2013.01); B32B 27/12 (2013.01);
(Continued)

(58) Field of Classification Search
CPC ..... C08L 9/06; B32B 1/08; B32B 5/02; B32B 27/12; B32B 27/18; B32B 27/302; B32B 27/32; B32B 2262/0276; B32B 2270/00; F16L 11/12; F16L 11/20; B29D 23/00; B29K 2009/06; B29K 2105/0044; B29K 2105/088

See application file for complete search history.

(56) References Cited

U.S. PATENT DOCUMENTS 5,476,121 A * 12/1995 Yoshikawa .......... B29D 23/001
                                                                138/143
7,758,937 B2 * 7/2010 Gong .................... F16L 11/085
                                                                138/143

(Continued)

*Primary Examiner* — David R Deal
(74) *Attorney, Agent, or Firm* — MUNCY, GEISSLER, OLDS & LOWE, P.C.

(57)        ABSTRACT

A composite telescopic hose and method for preparing the same. The composite telescopic hose includes an inner tube having the following raw materials in parts by weight: 20-50 parts of SEBS; 40-70 parts of a white oil; 3-15 parts of polypropylene; 3-12 parts of ethylene propylene diene monomer; 0.05 to 0.3 parts of an antioxidant; and 0.2-0.8 parts of an ultraviolet absorber. The inner tube of the composite telescopic hose is made of a material which has superior physical properties, high elongation at break and tensile strength, and can maintain structural integrity under extreme conditions, which significantly improve durability and service life of the product, and reduce maintenance cost. A synergistic composite formulation optimizes physical and mechanical properties of the material of the inner tube at a molecular level, achieving a balance between flowability, stability and mechanical properties, thereby ensuring that the hose performs well under various operating conditions.

7 Claims, 4 Drawing Sheets

(51) Int. Cl.

| | |
|---|---|
| *B32B 1/08* | (2006.01) |
| *B32B 5/02* | (2006.01) |
| *B32B 27/12* | (2006.01) |
| *B32B 27/30* | (2006.01) |
| *B32B 27/32* | (2006.01) |
| *C08L 9/06* | (2006.01) |
| *F16L 11/12* | (2006.01) |
| *F16L 11/20* | (2006.01) |
| *B29D 23/00* | (2006.01) |
| *B29K 105/00* | (2006.01) |

(52) U.S. Cl.
CPC ............ *B32B 27/18* (2013.01); *B32B 27/302* (2013.01); *B32B 27/32* (2013.01); *F16L 11/12* (2013.01); *F16L 11/20* (2013.01); *B29D 23/00* (2013.01); *B29K 2009/06* (2013.01); *B29K 2105/0044* (2013.01); *B29K 2105/0088* (2013.01); *B32B 2262/0276* (2013.01); *B32B 2270/00* (2013.01); *B32B 2597/00* (2013.01); *C08L 2205/03* (2013.01)

(56) References Cited

U.S. PATENT DOCUMENTS

| | | | | |
|---|---|---|---|---|
| 11,725,098 | B2 * | 8/2023 | Takacs | C08L 15/02 138/134 |
| 11,774,010 | B2 * | 10/2023 | Cegalin | B32B 27/302 138/125 |
| 2009/0205736 | A1 * | 8/2009 | Mezzalira | F16L 11/085 138/125 |
| 2010/0108172 | A1 * | 5/2010 | Liu | B29C 48/21 138/137 |
| 2012/0012222 | A1 * | 1/2012 | Mizutani | B32B 1/08 264/171.27 |
| 2015/0075666 | A1 * | 3/2015 | Clark | F16L 11/085 138/137 |
| 2015/0252918 | A1 * | 9/2015 | Garver | B32B 27/322 138/137 |
| 2018/0299038 | A1 * | 10/2018 | Mezzalira | B32B 25/14 |
| 2019/0145553 | A1 * | 5/2019 | Mezzalira | F16L 11/12 138/118 |
| 2021/0190240 | A1 * | 6/2021 | Gubitosa | F16L 11/085 |
| 2023/0250901 | A1 * | 8/2023 | Van Hooren | F24D 17/0073 138/125 |

* cited by examiner

Tensile strength

COMPOSITE TELESCOPIC HOSE AND PREPARATION METHOD THEREOF

TECHNICAL FIELD

The present invention pertains to a composite telescopic hose and a method for preparing the same.

BACKGROUND

Effective water source management is crucial in landscape and agricultural irrigation. In order to improve the efficiency of water use, a flexible and reliable irrigation system is required. Conventional fixed-length water pipes may not be flexible enough for different occasions and crops. These pipes usually have fixed lengths and diameters, and are therefore less flexible and adaptable when irrigation range or pressure needs to be adjusted.

To solve this problem, various telescopic irrigation water pipes have been launched on the market. These pipes are usually made of materials with good elasticity, such as rubber or plastic. These pipes can be automatically telescoped according to changes in water pressure, thereby changing lengths of the water pipes. However, these prior art pipes still have a series of problems, limiting their wide application.

For existing telescopic irrigation water pipes, inner tubes thereof are mostly made of composite materials with certain elasticity, and these composite materials are generally composed of styrene-ethylene-butylene styrene (SEBS), polypropylene (PP) and ethylene propylene diene monomer (EPDM). These materials are favored due to ease of synthesis, relatively low cost, and primary elastic properties.

However, such materials have the following disadvantages: (1) strength and durability problems: these elastic composite materials, while having acceptable performance under general service conditions, may exhibit limitations under extreme conditions, prolonged or high water-pressure applications may result in stress whitening, deformation, cracking or breakage of the materials of the inner tubes, which not only limits service life of the product, but may also increase maintenance and replacement costs; (2) stress concentration and fatigue: the composite material may experience local stress concentration and material fatigue resulting from multiple telescoping or switching between high water temperature and low water pressure, These factors further increase the risk of pipe leakage or breakage.

In summary, while the existing telescopic irrigation water pipes have solved the limitations of fixed-length water pipes to some extent, these solutions are still inadequate due to the multiple problems and limitations described above. Therefore, it is highly desirable to develop a novel, more reliable, more durable and more environmentally-friendly telescopic irrigation water pipe. This novel water pipe should have high strength, long service life, low maintenance cost and wider applicability to meet irrigation requirements for different occasions and crops.

SUMMARY

In order to solve the technical defects described above, the present invention proposes a composite telescopic hose and a method for preparing the same.

In order to achieve the above object, the present invention uses the following technical solutions.

The present invention provides a composite telescopic hose comprising an inner tube and an outer tube, and the inner tube comprises the following raw materials in parts by weight:

20-50 parts of SEBS;
40-70 parts of a white oil;
3-15 parts of polypropylene;
3-12 parts of ethylene propylene diene monomer;
0.05 to 0.3 parts of an antioxidant; and
0.2-0.8 parts of an ultraviolet absorber.

Preferably, the inner tube comprises the following raw materials in parts by weight:

30-40 parts of SEBS;
50-60 parts of a white oil;
5-10 parts of polypropylene;
5-10 parts of ethylene propylene diene monomer;
0.1 to 0.2 parts of an antioxidant; and
0.3-0.5 parts of an ultraviolet absorber.

The white oil is at least one of white oil No. 3, white oil No. 5, white oil No. 7, white oil No. 10, white oil No. 15, white oil No. 26, white oil No. 32, white oil No. 36, white oil No. 46, white oil No. 68, white oil No. 100, white oil No. 150 and white oil No. 200.

Preferably, the white oil is at least one of white oil No. 7, white oil No. 10, white oil No. 15, white oil No. 26, white oil No. 32, white oil No. 36, white oil No. 46, white oil No. 68 and white oil No. 100.

The present invention also discloses a method for preparing an inner tube which comprises the following steps:

(1) stirring and mixing SEBS and a white oil at 500-1500 rpm for 5-15 minutes, taking out and standing for 12-24 hours to obtain oil-extended SEBS;

(2) mixing the oil-extended SEBS, polypropylene, ethylene propylene diene monomer, an antioxidant and an ultraviolet absorber to obtain a mixture;

(3) adding the mixture to a twin screw extruder for pelletizing; and (4) making the inner tube.

Preferably, the step (2) comprises stirring and mixing the oil-extended SEBS, polypropylene, ethylene propylene diene monomer, an antioxidant and an ultraviolet absorber at 300-800 rpm for 15-45 minutes to obtain a mixture.

Preferably, a composite telescopic hose comprises a hose body which comprises an inner tube and an outer tube arranged outside the inner tube.

Preferably, an inner wall of the inner tube is provided with corrugated groove, enabling telescoping of the hose body.

The present invention also provides a method for preparing a composite telescopic hose which comprises the following steps:

a. preparing an outer tube and an inner tube, wherein the outer tube is intended to wrap the inner tube, and the inner tube is intended to transport a medium;

b. sheathing a cross braided polyester layer between the inner tube and the outer tube; and c. integrally forming the inner tube, the polyester layer and the outer tube using a conventional heat fusion technique.

The inner tube of the composite telescopic hose of the present invention is made of a material which has superior physical properties comprising high elongation at break and tensile strength, and can maintain structural integrity under extreme conditions, which significantly improve durability and service life of the product, and reduce maintenance cost. A synergistic composite formulation optimizes physical and mechanical properties of the material of the inner tube at a molecular level, achieving a balance between flowability, stability and mechanical properties, thereby ensuring that the hose performs well under various operating conditions.

BRIEF DESCRIPTION OF THE DRAWINGS

In order to illustrate the technical solutions of the embodiments of the present invention or the prior art more clearly, the drawings to be used in the description of the examples or the prior art will be briefly described below. Apparently, the drawings in the following description are only some examples of the present invention, and a person of ordinary skill in the art can obtain other drawings based on these drawings without making any creative effort.

DESCRIPTION OF THE EMBODIMENTS

Figure 1:
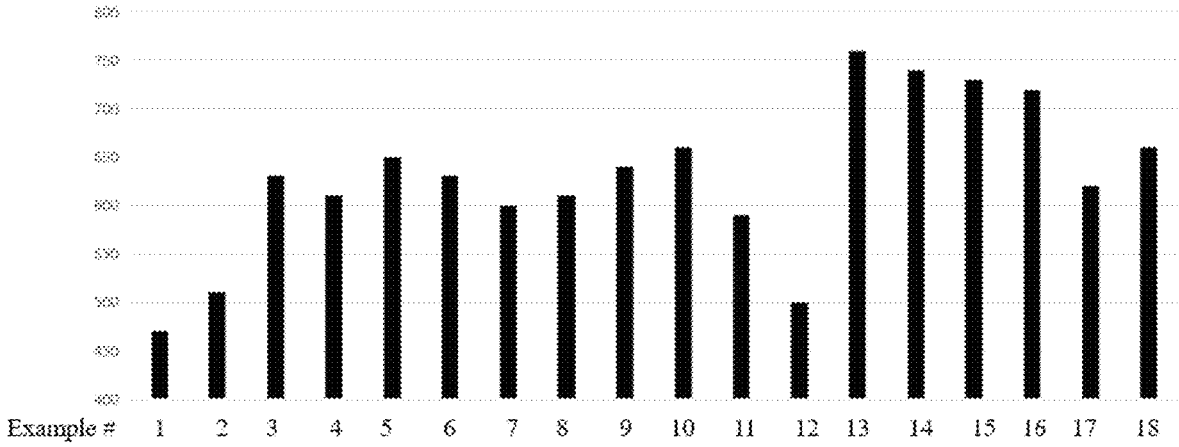
FIG. 1 is a chart of elongation at break test data of plastic particles for a hose inner tube.

The present invention can be understood more readily by reference to the following detailed description of preferred embodiments of the present invention and the examples included therein. Unless otherwise defined herein, all technical and scientific terms used herein have the same meaning as commonly understood by one of ordinary skill in the art to which the present invention belongs. In case of any conflict, the definitions in the description shall prevail.

A composite telescopic hose comprises an inner tube and an outer tube, and the inner tube comprises the following raw materials in parts by weight:

30-40 parts of SEBS;
50-60 parts of a white oil;
5-10 parts of polypropylene;
5-10 parts of ethylene propylene diene monomer;
0.1 to 0.2 parts of an antioxidant; and
0.3-0.5 parts of an ultraviolet absorber.

The white oil is at least one of white oil No. 7, white oil No. 10, white oil No. 15, white oil No. 26, white oil No. 32, white oil No. 36, white oil No. 46, white oil No. 68 and white oil No. 100.

In the present invention:

The SEBS is composed of a hard segment (polystyrene, PS) and a soft segment (hydrogenated butadiene, EB), and such dual structure gives the SEBS unique elastic and mechanical properties. The hard segment (PS) acts as a physical crosslinking point, providing superior elasticity and high rigidity for the SEBS at temperatures below its melting point. A glass transition temperature of the soft segment EB is below room temperature, which allows the SEBS to have good high elasticity at normal temperature. When the SEBS is used as a base material of the hose, these properties give the hose good elasticity, tensile strength and compression resistance.

However, the SEBS has a high molecular weight, meaning a relatively high melt viscosity, which affects its flowability during processing. Therefore, in practice, there is often a need to improve this situation in some way so that production can be easily carried out through plastic processing processes. Adding the white oil to the SEBS can effectively reduce viscosity of the material. This is due to good compatibility of the white oil with the EB segment in the SEBS, which can reduce intermolecular friction and entanglement, thereby increasing overall flowability. The addition of the white oil can also increase its softness. This is particularly important for manufacturing products that require high softness, such as a soft tubing. The white oil can effectively reduce the viscosity of the SEBS, so that the SEBS can be easily processed through common plastic processing techniques (e.g., extrusion, injection molding, etc.). The white oil reduces intermolecular force of the SEBS, which helps to reduce elastic deformation and compression set of the material after a force is applied, thereby improving service life of the product. The addition of the white oil also allows the SEBS material to return to its original state fast after being stressed, that is, increasing its resilience.

Polypropylene is a thermoplastic with high rigidity and strength. In composite telescopic hose applications, the polypropylene mainly functions to provide additional hardness and rigidity. This feature is particularly important for applications where it is desirable for the hose to maintain shape and function in high water-pressure environments. The polypropylene has good thermal stability, so that the polypropylene can maintain its physical and chemical properties unchanged in high-temperature environments. This is especially important when the hose needs to be used for high-temperature fluid transfer or in high-temperature environments. The polypropylene (PP) is generally less costly than the SEBS and the ethylene propylene diene monomer (EPDM). Therefore, adding the polypropylene helps to reduce the overall manufacturing cost. Hardness and rigidity of the polypropylene also contribute to improving abrasion resistance of the hose and extending the service life of the product.

The ethylene propylene diene monomer (EPDM) is a rubber with excellent weather resistance and oil resistance. This enables a hose using such material to maintain its properties and shape under a variety of harsh environmental conditions, including exposure to ultraviolet light, oxygen, ozone and various chemicals. The EPDM has excellent flexibility, meaning that it can provide good bending capacity and folding resistance for the composite telescoping hose. This flexibility makes the hose flexible and versatile in different applications such as horticulture, industrial or home applications. A chemical structure of the EPDM gives it good resistance to high and low temperatures. This property is particularly important when the hose needs to operate under extreme temperature conditions. The EPDM can work well with other components such as the SEBS and the polypropylene, which further improves overall properties of the hose, such as abrasion resistance, aging resistance and mechanical properties.

Adding the antioxidant can further improve the aging resistance of the hose.

Adding the UV absorber helps to prevent degradation of the hose material by UV radiation and extend its service life.

In the present invention, the white oil (a plasticizer) is used to swell the SEBS before blending with the polypropylene and the ethylene propylene diene monomer, which increases the softness and ductility of the SEBS and improves its abrasion resistance and tensile resistance.

The present invention also discloses a method for preparing an inner tube which comprises the following steps:

(1) stirring and mixing SEBS and a white oil at 500-1500 rpm for 5-15 minutes, taking out and standing for 12-24 hours to allow the SEBS to swell sufficiently to obtain oil-extended SEBS;

(2) stirring and mixing the oil-extended SEBS, polypropylene, ethylene propylene diene monomer, an antioxidant and an ultraviolet absorber at 300-800 rpm for 15-45 minutes to obtain a mixture;

(3) adding the mixture to a twin screw extruder for pelletizing; and (4) making the inner tube.

To make the hose of the present invention, oil extension and swelling of the SEBS with the white oil as a plasticizer gives multiple effects: (1) improved processability: the SEBS inherently has a very high molecular weight and viscosity, which can cause difficulties in processing; the addition of the white oil can reduce intermolecular friction and entanglement of the SEBS, thereby improving its flowability; and this feature is particularly advantageous for subsequent extrusion or injection molding processes; (2) improved softness and elasticity: the white oil has good compatibility with the EB soft segment in the SEBS, which helps to improve the softness and elasticity of the material; and this modification makes the hose soft and flexible in use and easy to be mounted and used; and (3) improved composite compatibility: the SEBS oil extended and swollen with the white oil is readily blended with the polypropylene and the ethylene propylene diene monomer. As a compatibilizer, the white oil helps different polymers to mix well.

Further, blending the oil-extended SEBS with the polypropylene and the ethylene propylene diene monomer will result in the following effects: (1) comprehensive performance improvement: the polypropylene increases hardness and rigidity of the hose, while the EPDM increases weather resistance and flexibility of the hose, in this way, the hose can perform well in a variety of environmental conditions; (2) cost reduction: the polypropylene is generally cheaper than the SEBS and the EPDM, so its addition helps to reduce the overall cost; (3) improved production efficiency: since the addition of the white oil improves the flowability of the SEBS, its blending with the polypropylene and the EPDM is also more efficient, which contributes to improving the production efficiency; and (4) optimized mechanical properties: due to unique mechanical properties of each material, a well-designed blending ratio of such materials can result in a hose product with excellent comprehensive mechanical properties such as tensile strength, impact strength and abrasion resistance.

In summary, swelling the SEBS with the white oil before blending with the polypropylene and the ethylene propylene diene monomer not only helps to improve processability of each component and service performance of the final product, but also reduces the cost and improves the production efficiency.

The white oil is at least one of white oil No. 7, white oil No. 10, white oil No. 15, white oil No. 26, white oil No. 32, white oil No. 36, white oil No. 46, white oil No. 68 and white oil No. 100. The larger the white oil grade, the greater the kinematic viscosity.

The inventors tested various white oils and found that not all industrial white oils are effective in enhancing performance of a formulation system of the present invention. For example, white oil No. 150 and white oil No. 200 are not desirable due to a kinematic viscosity exceeding 100 mm²/s at 40° C., while white oil No. 3 and white oil No. 5 are also not desirable due to a kinematic viscosity below 6 mm²/s. Thus, it is appropriate to oil-extend the SEBS with the white oil No. 7, white oil No. 10, white oil No. 15, white oil No. 26, white oil No. 32, white oil No. 36, white oil No. 46, white oil No. 68 and white oil No. 100 which have a kinematic viscosity of 6-100 mm²/s at 40° C.

The inventors also found that the oil extension effect of the white oil on the SEBS is related to the kinematic viscosity, but there is no simple mathematical relationship of increasing functions or decreasing functions. The effect is greatly enhanced when a low kinematic viscosity white oil is compounded with a high kinematic viscosity white oil, and its mechanism remains to be further explored.

Through further tests, the inventors found that compounding the low kinematic viscosity white oil with the high kinematic viscosity white oil results in a surprisingly synergistic effect. A further improvement was thus obtained, where the white oil is a product of compounding at least one of the white oil No. 7 and the white oil No. 10 with at least one of the white oil No. 46 and the white oil No. 68. That is, the white oil is a product of compounding the white oil No. 7 with the white oil No. 46. Alternatively, the white oil is a product of compounding the white oil No. 7 with the white oil No. 68. Alternatively, the white oil is a product of compounding the white oil No. 10 with the white oil No. 46. Alternatively, the white oil is a product of compounding the white oil No. 10 with the white oil No. 68. A mass ratio of the low kinematic viscosity white to the high kinematic viscosity white oil is (20-40):(15-35).

A composite telescopic hose comprises a hose body which comprises an inner tube and an outer tube arranged outside the inner tube.

The inner tube is an inner tube prepared as above, and an inner wall of the inner tube is provided with corrugated grooves, enabling telescoping of the hose body; and the outer tube is made of a conventional plastic material in the industry.

A method for preparing a composite telescopic hose comprises the following steps:

a. preparing an outer tube and an inner tube, wherein the outer tube is intended to wrap the inner tube, and the inner tube is intended to transport a medium;

b. sheathing a cross braided polyester layer between the inner tube and the outer tube;

c. integrally forming the inner tube, the polyester layer and the outer tube using a conventional heat fusion technique to obtain a hose;

d. cutting and processing the integrally formed hose to result in a desired length and shape;

e. performing quality inspection and testing on the hose to ensure that there are no leaks and that telescoping performance meets the requirements; and f. packing the prepared composite telescopic hose.

The composite telescopic hose of the present invention has a number of important advantages in terms of selection and formulation optimization of a material of the inner tube, and these advantages perfectly solve the technical defects present in the prior art:

Superior physical properties: the material of the inner tube used in the present invention has superior physical properties such as high elongation at break and tensile strength. This means that the composite telescopic hose can maintain its structural integrity under telescoping, high water-pressure and extreme conditions, and is less prone to stress whitening, deformation, cracking or breakage. This property significantly improves durability and service life of the product, reducing maintenance and replacement costs.

Resistance to stress concentration and fatigue: optimization of the material of the inner tube enables the composite flexible hose to resist stress concentration and material fatigue under multiple telescoping and switching between high water pressure and low water pressure. This reduces the risk of local damage or leakage of the hose, ensuring its reliability under various operating conditions.

Synergistic composite formulation: the material of the inner tube used in the present invention has a well-designed formulation which comprises various components such as SEBS, polypropylene and ethylene propylene diene monomer. By compounding a low kinematic viscosity white oil with a high kinematic viscosity white oil, such materials achieve a synergistic effect at a molecular level, thereby optimizing physical and mechanical properties. Such optimized balance establishes a good balance between flowability and processability as well as stability and mechanical properties of the materials, such that the material of the hose performs well in all respects.

Adaptation to extreme conditions: the material of the inner tube of the composite telescopic hose of the present invention can perform well under extreme conditions, including long-term use, high water pressure environments and frequent telescopic operations. This allows the material of the hose to be very suitable for a variety of applications, including areas where high strength and durability are required, such as agricultural irrigation, industrial applications and construction works.

Reduced maintenance cost: Due to the excellent durability and stability of the composite telescopic hose of the present invention, the hose requires less maintenance and replacement. This will reduce the maintenance cost, reduce downtime and improve the production efficiency.

In summary, by optimizing the material of the inner tube, the composite telescopic hose of the present invention overcomes the technical defects such as strength and durability problems, stress concentration and fatigue present in the prior art, providing superior physical properties and durability, and bringing significant advantages to the application of telescopic irrigation water pipes. These advantages will help to reduce the maintenance cost, improve product reliability, and extend application potential of the hose in various areas.

In the following examples of the present invention:

SEBS: YH-502T injection grade SEBS from Sinopec Baling Petrochemical Co., Ltd.

Polypropylene: grade B8101 polypropylene from Sinopec Yanshan Petrochemical Company.

Ethylene propylene diene monomer (EPDM): 3745P EPDM from Dow Chemical (Trinseo).

White oil No. 150: industrial white oil No. 150 provided by Guanjiuzhou (Shandong) Energy Technology Co., Ltd., having a kinematic viscosity of 138 mm²/s at 40° C.

White oil No. 100: industrial white oil No. 100 supplied by Sinopec, having a kinematic viscosity of 96.0 mm²/s at 40° C.

White oil No. 68: industrial white oil No. 68 supplied by Sinopec, having a kinematic viscosity of 68.6 mm²/s at 40° C.

White oil No. 46: industrial white oil No. 46 supplied by Sinopec, having a kinematic viscosity of 44.6 mm²/s at 40° C.

White oil No. 36: industrial white oil No. 36 supplied by Sinopec, having a kinematic viscosity of 35.7 mm²/s at 40° C.

White oil No. 32: industrial white oil No. 32 supplied by Sinopec, having a kinematic viscosity of 32.2 mm²/s at 40° C.

White oil No. 26: industrial white oil No. 26 supplied by Sinopec, having a kinematic viscosity of 26.5 mm²/s at 40° C.

White oil No. 15: industrial white oil No. 15 supplied by Sinopec, having a kinematic viscosity of 15.2 mm²/s at 40° C.

White oil No. 10: industrial white oil No. 10 supplied by Sinopec, having a kinematic viscosity of 9.8 mm²/s at 40° C.

White oil No. 7: industrial white oil No. 7 supplied by Sinopec, having a kinematic viscosity of 6.5 mm²/s at 40° C.

White oil No. 5: industrial white oil No. 5 supplied by Sinopec, having a kinematic viscosity of 4.2 mm²/s at 40° C.

White oil No. 3: industrial white oil No. 3 supplied by Sinopec, having a kinematic viscosity of 2.8 mm²/s at 40° C.

Examples 1-18

A formulation of plastic particles for a hose inner tube of Examples 1-18 comprised the following raw materials in parts by weight:

35 parts of SEBS;
55 parts of a white oil corresponding to Table 1;
8 parts of polypropylene;
8 parts of ethylene propylene diene monomer (EPDM);
0.15 parts of an antioxidant 1010; and
0.4 parts of an ultraviolet absorber UV-326.

A method for preparing plastic particles for a hose inner tube comprised the following steps:

(1) stirring and mixing SEBS and a white oil at 1000 rpm for 10 minutes, taking out and standing for 18 hours to allow the SEBS to swell sufficiently to obtain oil-extended SEBS;

(2) stirring and mixing the oil-extended SEBS, polypropylene, ethylene propylene diene monomer, an antioxidant and an ultraviolet absorber at 500 rpm for 30 minutes to obtain a mixture; and (3) adding the mixture to a twin screw extruder for pelletizing by a conventional method.

The plastic particles for the hose inner tube described above were made into a hose inner tube (102) with a desired size by a conventional method in the art.

TABLE 1

| Corresponding specific model of raw material white oil in Examples 1-18 | |
| --- | --- |
| | Raw material white oil |
| Example 1 | White oil No. 3: 55 parts |
| Example 2 | White oil No. 5: 55 parts |
| Example 3 | White oil No. 7: 55 parts |
| Example 4 | White oil No. 10: 55 parts |
| Example 5 | White oil No. 15: 55 parts |
| Example 6 | White oil No. 26: 55 parts |
| Example 7 | White oil No. 32: 55 parts |
| Example 8 | White oil No. 36: 55 parts |
| Example 9 | White oil No. 46: 55 parts |
| Example 10 | White oil No. 68: 55 parts |
| Example 11 | White oil No. 100: 55 parts |
| Example 12 | White oil No. 150: 55 parts |
| Example 13 | 30 parts of white oil No. 7 + 25 parts of white oil No. 68 |

TABLE 1-continued

| Corresponding specific model of raw material white oil in Examples 1-18 | |
| --- | --- |
| | Raw material white oil |
| Example 14 | 30 parts of white oil No. 10 + 25 parts of white oil No. 68 |
| Example 15 | 30 parts of white oil No. 7 + 25 parts of white oil No. 46 |
| Example 16 | 30 parts of white oil No. 10 + 25 parts of white oil No. 46 |
| Example 17 | 30 parts of white oil No. 26 + 25 parts of white oil No. 32 |
| Example 18 | 30 parts of white oil No. 15 + 25 parts of white oil No. 36 |

Table 1 corresponds to a chart of elongation at break test data of plastic particles for a hose inner tube in FIG. 1.

Test Example 1

The plastic particles for the hose inner tube of the examples were injection molded into standard dumbbell-shaped bars and standard discs, the dumbbell-shaped bars had a working cross-sectional area of 6 mm×2 mm, and the discs had a thickness of 6 mm.

According to national standard GB/T 1040.1-2018 Plastics-Determination of tensile properties-Part 1: General principles, the bars which were type 1A dumbbell-shaped bars were tested at a tensile speed of 20 mm/min using an electronic universal testing machine at 25° C. and 50% humidity.

TABLE 1

| Physical property test of the plastic particles for the hose inner tube | | |
| --- | --- | --- |
| | Elongation at break/% | Tensile strength/MPa |
| Example 1 | 470 | 7.1 |
| Example 2 | 510 | 7.6 |
| Example 3 | 630 | 9.3 |
| Example 4 | 610 | 9.0 |
| Example 5 | 650 | 9.6 |
| Example 6 | 630 | 9.5 |
| Example 7 | 600 | 8.8 |
| Example 8 | 610 | 8.9 |
| Example 9 | 640 | 9.6 |
| Example 10 | 660 | 9.4 |
| Example 11 | 590 | 8.5 |
| Example 12 | 500 | 7.4 |
| Example 13 | 760 | 10.9 |
| Example 14 | 740 | 10.6 |
| Example 15 | 730 | 10.5 |
| Example 16 | 720 | 10.3 |
| Example 17 | 620 | 9.3 |
| Example 18 | 660 | 9.4 |

Figure 2:
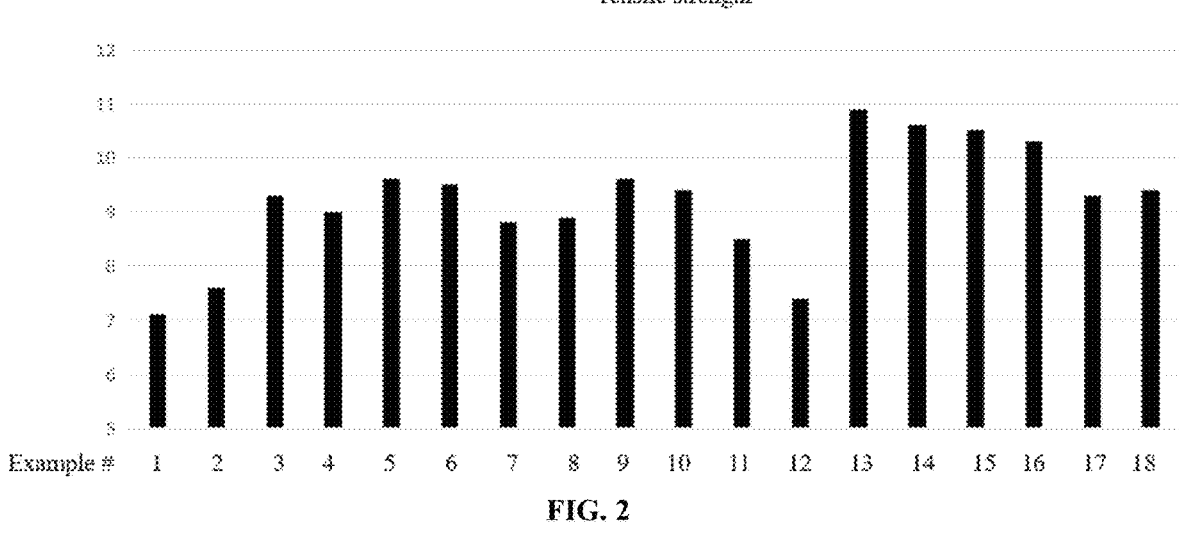
FIG. 2 is a chart of tensile strength test data of plastic particles for a hose inner tube.

Table 2 corresponds to a chart of tensile strength test data of plastic particles for a hose inner tube in FIG. 2.

By compounding a low kinematic viscosity white oil with a high kinematic viscosity white oil, the inventors found a synergistic effect on improving mechanical properties. This synergistic effect may be due to different interactions of the white oils of different viscosities with the SEBS at a molecular level, thereby optimizing the physical and mechanical properties of the SEBS to some extent.

The inventors speculated that in a multi-component polymer system such as a system composed of SEBS, white oil, polypropylene and ethylene propylene diene monomer, complexity of the interaction needs to be considered from multiple perspectives. The low kinematic viscosity white oil and the high kinematic viscosity white oil had a significant synergistic effect on the SEBS, which may be a result of a combined action of multiple mechanisms.

First, due to a small molecular structure, the low kinematic viscosity white oil can easily cross a molecular structure of the SEBS. This reduces friction and interaction between SEBS molecules, thereby improving flowability and processability of the material. At the same time, due to these properties of the low viscosity white oil, a molecular chain of the SEBS moves easily, resulting in efficient swelling. This also helps to improve certain mechanical properties of the SEBS, such as elasticity and hardness.

The high kinematic viscosity white oil may then act as a "filler" or "buffer" in the molecular structure. Such a white oil is likely to remain in a microstructure of the SEBS due to a large molecular structure and high viscosity, playing a stabilizing role. Such stabilization helps to maintain an overall structure of the molecular chain of the SEBS, improving its mechanical properties and thermal stability to some extent.

Thus, compounding the low kinematic viscosity white oil with the high kinematic viscosity white oil not only results in good flowability and processability, but also leads to an optimization at a molecular level so as to improve the physical and mechanical properties of the SEBS. This compounding results in an optimized equilibrium state in which the low kinematic viscosity white oil is primarily responsible for improving the flowability and promoting swelling, while the high kinematic viscosity white oil mostly plays a role in stabilizing and enhancing the mechanical properties.

Example 19

Figure 3:
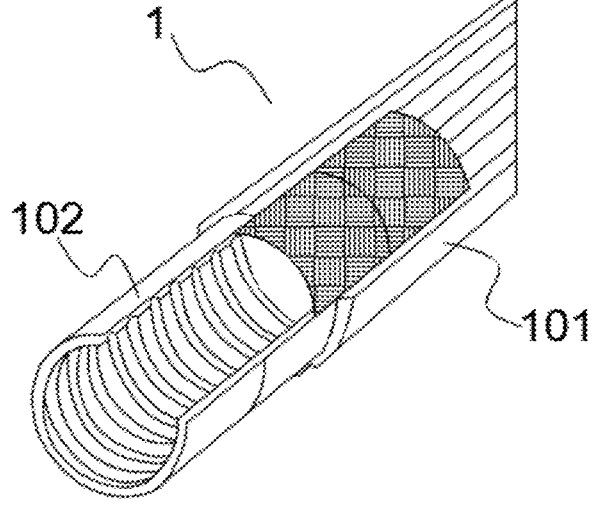
FIG. 3 is a structural schematic diagram of a composite telescopic hose according to the present invention.

FIG. 3 is a structural schematic diagram of a composite telescopic hose according to the present invention. Specifically, a composite telescopic hose comprised a hose body (1), the hose body (1) comprised an outer tube (101) and an inner tube (102), the outer tube (101) was arranged outside the inner tube (102); and a glue was filled between the outer tube (101) and the inner tube (102) for adhesion.

The outer tube (101) and the inner tube (102) were integrally formed using a conventional heat fusion technique, which helped to increase airtightness and stability of the entire hose structure. This prevented liquid or gas leakage and ensured that the stability was maintained at high pressures.

The inner tube (102) was an inner tube prepared in Examples 1-18, and an inner wall of the inner tube was provided with corrugated grooves which enabled telescoping of the hose body. The corrugated grooves allowed the inner tube to extend or retract when desired, which is useful in a variety of operating environments and occasions (e.g., where a space is limited or a distance needs to be spanned). The inner tube (102) was an inner tube prepared in Examples 1-18, thus having excellent comprehensive mechanical properties such as elongation at break and tensile strength. The excellent tensile strength indicated that the inner tube (102) can withstand high internal and external pressures, reducing the risk of hose damage or leakage due to excessive pressure. Excellent elongation at break indicated that the material is able to extend in a great proportion when subjected to a tensile force without breakage. This increased flexibility and adaptability of the inner tube, especially in applications requiring telescoping or bending.

Excellent mechanical properties were also often accompanied by good abrasion resistance. Abrasion inside a pipe is a common problem during fluid transfer. Improved strength and ductility can slow down abrasion process and extend service life of the hose.

Figure 6:
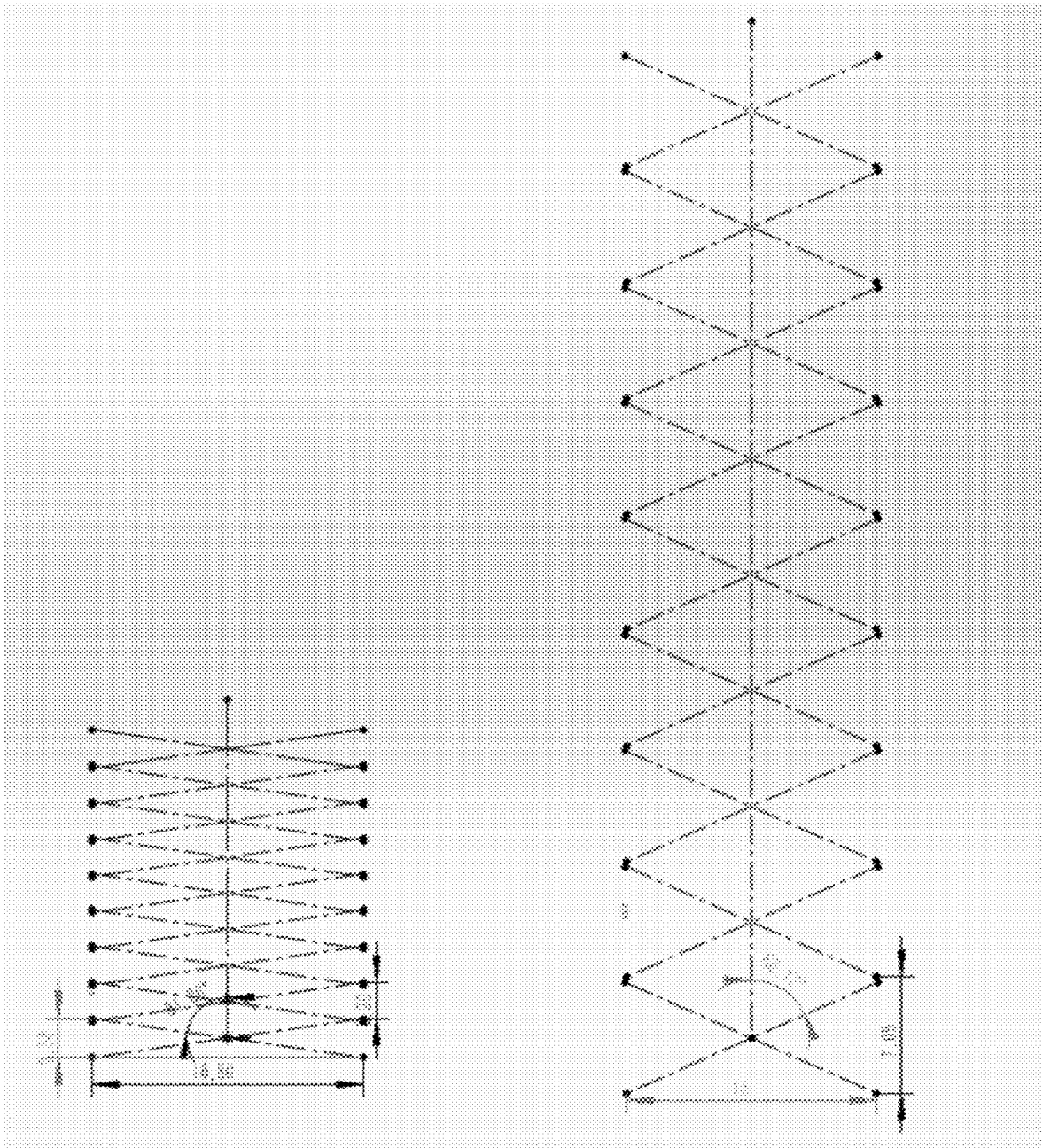
FIG. 6 is a diagram of a comparison of data before and after telescoping of a hose according to the present invention.

In addition, preferably, a braided polyester layer was added between the outer tube 101 and the corrugated inner tube 102, so that it was advantageous for the hose to be stressed. Before the braided polyester layer was telescoped, a spacing between braided cords was 2.37 mm, an angle was 81.8°, and a width (diameter) was 16.5 mm before being stretched. After telescoping, the spacing was 7.05 mm, the angle was 66.17°, and the width (diameter) was 15 mm after being stretched, as shown in FIG. 6. As commercially available products are under specific water pressures, unfixed water pipes are extended without limitation until they are broken. However, adding braided polyester cords to this product can change the spacing before and after exten- sion of the cords. First, under a specific water pressure, the hose body will not be broken due to increased extension resulting from the water pressure. Second, a burst value of the original product can be increased by 20%-30%. A thickness of the braided cords was 50d-3500d, with 3 strands forming a single wire, and a total of 4-24 strands were cross braided. The braided cords were bound to the corrugated inner tube 102 and then fused with the outer tube 101.

The outer tube (101) was made of a conventional plastic material in the industry, and such material usually has good corrosion resistance and mechanical strength. When the outer tube and the inner tube were combined, a strong and flexible structure could be formed.

Figure 4:
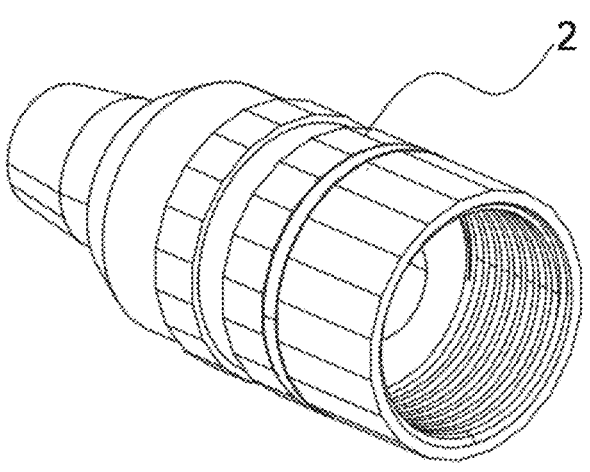
FIG. 4 is a structural schematic diagram of a connecting chuck connected to a composite telescopic hose according to the present invention.

FIG. 4 is a structural schematic diagram of a connecting chuck connected to a composite telescopic hose according to the present invention. A hose connecting chuck (2) is con- nected to an end of the outer tube (101) of the hose body (1).

The hose connecting chuck (2) is generally intended to provide a secure and stable connection point for connecting the hose body (1) to other systems or devices (e.g., valves, pipes, faucets, etc.). It ensures airtightness and mechanical strength between the hose body and other components. A chuck design usually makes connection and disassembly simple and fast. This is particularly useful for the systems that require frequent replacement or maintenance. The simple disassembly also reduces maintenance cost and time. The hose connecting chuck (2) is typically made of a material that is resistant to high pressures and is capable of withstanding the pressure within the system to ensure that the hose body (1) does not break due to excessive pressure. The hose connecting chuck (2) can be designed in a variety of specifications and sizes to adapt to different connection requirements and applications. This means that the same type of hose can be used for a number of different applica- tions simply by replacing the hose connecting chuck with an appropriate chuck. In some applications, the hose connect- ing chuck (2) may also have a function of controlling a direction of fluid flow, for example, having a built-in one- way valve or other flow control device.

Figure 5:
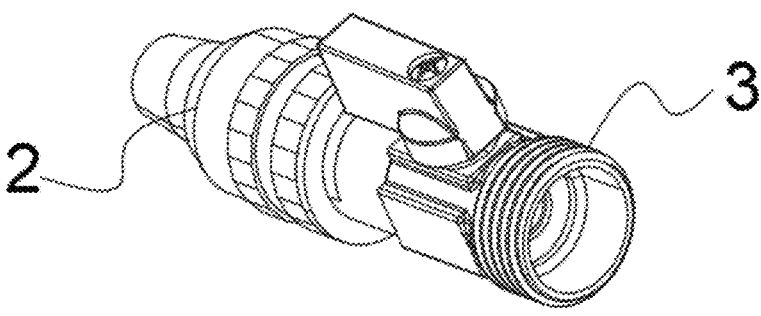
FIG. 5 is a schematic diagram of a connection structure between a connecting chuck and a valve according to the present invention.

FIG. 5 is a schematic diagram of a connection structure between a connecting chuck and a valve according to the present invention. An external valve (3) is connected through the hose connecting chuck (2).

The valve (3) allows flow of a liquid to be controlled. A fluid flow rate or direction may be changed by opening, closing or partially regulating the valve. If a system fails or requires maintenance, the external valve (3) can be used to isolate the hose body (1) or other system components connected thereto to ensure safe operation and maintenance. The external valve (3) mounted through the hose connecting chuck (2) makes operation convenient. A user can easily open or close the valve without disassembling the entire hose system. Since the valve (3) is mounted through the hose connecting chuck (2), the valve can be replaced with dif- ferent types or specifications of valves as required. Such design increases flexibility and adaptability of the system.

A method for preparing a composite telescopic hose comprises the following steps:

a. preparing an outer tube and an inner tube, wherein the outer tube is intended to wrap the inner tube, and the inner tube is intended to transport a medium;

b. sheathing a cross braided polyester layer between the inner tube and the outer tube;

c. integrally forming the inner tube, the polyester layer and the outer tube using a conventional heat fusion technique to obtain a hose;

d. cutting and processing the integrally formed hose to result in a desired length and shape;

e. performing quality inspection and testing on the hose to ensure that there are no leaks and that telescoping performance meets the requirements; and f. packing the prepared composite telescopic hose.

The inner tube of the composite telescopic hose of the present invention is made of the material which exhibits exceptional physical properties comprising superior elonga- tion at break and tensile strength, enabling it to maintain excellent structural integrity under the worst environmental conditions, thereby significantly improving durability and service life of the product and greatly reducing maintenance cost. This superior performance is attributed to the syner- gistic effect of the composite formulation which optimizes the physical and mechanical properties at the molecular level, achieving an ideal balance between flowability, sta- bility and mechanical properties, ensuring that the hose exhibits superior performance under various operating con- ditions.

The above description merely illustrates specific embodi- ments of the present invention and is not intended to limit the scope of protection of the present invention. Any varia- tion or replacement made without creative efforts shall be covered by the scope of protection of the present invention. Therefore, the scope of protection of the present invention should subject to the scope of the appended claims.

What is claimed is:

1. A composite telescopic hose, comprising an inner tube and an outer tube, wherein the inner tube comprises the following raw materials in parts by weight:

20-50 parts of SEBS;

40-70 parts of a white oil;

3-15 parts of polypropylene;

3-12 parts of ethylene propylene diene monomer;

0.05 to 0.3 parts of an antioxidant; and 0.2-0.8 parts of an ultraviolet absorber.

2. The composite telescopic hose according to claim 1, wherein the inner tube comprises the following raw mate- rials in parts by weight:

30-40 parts of SEBS;

50-60 parts of a white oil;

5-10 parts of polypropylene;

5-10 parts of ethylene propylene diene monomer;

0.1 to 0.2 parts of an antioxidant; and 0.3-0.5 parts of an ultraviolet absorber.

3. The composite telescopic hose according to claim 1, wherein the white oil is at least one of white oil No. 3, white oil No. 5, white oil No. 7, white oil No. 10, white oil No. 15, white oil No. 26, white oil No. 32, white oil No. 36, white oil No. 46, white oil No. 68, white oil No. 100, white oil No. 150 and white oil No. 200.

4. The composite telescopic hose according to claim 3, wherein the white oil is at least one of white oil No. 7, white oil No. 10, white oil No. 15, white oil No. 26, white oil No. 32, white oil No. 36, white oil No. 46, white oil No. 68 and white oil No. 100.

5. The composite telescopic hose according to claim 1, wherein the inner tube is prepared by the following steps:

(1) stirring and mixing the SEBS and the white oil at 500-1500 rpm for 5-15 minutes, taking out and standing for 12-24 hours to obtain oil-extended SEBS;

(2) mixing the oil-extended SEBS, the polypropylene, the ethylene propylene diene monomer, the antioxidant and the ultraviolet absorber to obtain a mixture;

(3) adding the mixture to a twin screw extruder for pelletizing; and (4) making the inner tube.

6. The composite telescopic hose according to claim 5, wherein the step (2) comprises stirring and mixing the oil-extended SEBS, the polypropylene, the ethylene propylene diene monomer, the antioxidant and the ultraviolet absorber at 300-800 rpm for 15-45 minutes to obtain the mixture.

7. A method for preparing the composite telescopic hose according to claim 1, comprising the following steps:

a. preparing an outer tube and an inner tube, wherein the outer tube is intended to wrap the inner tube, and the inner tube is intended to transport a medium;

b. sheathing a cross braided polyester layer between the inner tube and the outer tube; and c. integrally forming the inner tube, the polyester layer and the outer tube using a conventional heat fusion technique.

\*   \*   \*   \*   \*